United States Patent [19]

Schneider et al.

[11] 4,418,520
[45] Dec. 6, 1983

[54] THRUST SWIVEL BEARING ON MOWING KNIVES SUPPORTED IN SWINGING LEVERS OF MOWER CUTTING SYSTEMS

[75] Inventors: Rudolf Schneider, Remscheid; Bruno Hüsch, Bad Neuenahr-Ahrweiler, both of Fed. Rep. of Germany

[73] Assignee: Busatis-Werke GmbH u.Co K.G. Boge GmbH, Eitorf, Fed. Rep. of Germany

[21] Appl. No.: 154,365

[22] Filed: May 29, 1980

[30] Foreign Application Priority Data

Jun. 2, 1979 [DE] Fed. Rep. of Germany ....... 2922579

[51] Int. Cl.³ .......................................... A01D 55/02
[52] U.S. Cl. .................................................... 56/297
[58] Field of Search ................. 56/296, 297, 298, 299, 56/300, 301, 302; 279/105

[56] References Cited

U.S. PATENT DOCUMENTS 3,058,288 10/1962 Karg ..................................... 56/297
4,067,179 1/1978 Schneider ............................. 56/297
4,267,689 5/1981 Schneider et al. ................... 56/297

FOREIGN PATENT DOCUMENTS 640223 12/1936 Fed. Rep. of Germany ........ 56/300
1375212 9/1964 France ................................. 56/297

*Primary Examiner*—Robert A. Haffer
*Attorney, Agent, or Firm*—Toren, McGeady and Stanger

[57] ABSTRACT

A thrust swivel ring for resiliently supporting a mowing knife in a swing arm of a mower cutting system includes internal and external metal bushings and an annular rubber portion disposed between the two bushings. The external bushing is non-rotatably connected to the swing arm and the internal bushing is non-rotatably connected to the mowing knife. One of these connections can be quickly disconnected in axial direction of the bushings. The bearing is resistant to wear, requires little maintenance and ensures a quiet operation of the mower cutting system. Further, the bearing facilitates a quick replacement of the mower knife.

19 Claims, 14 Drawing Figures

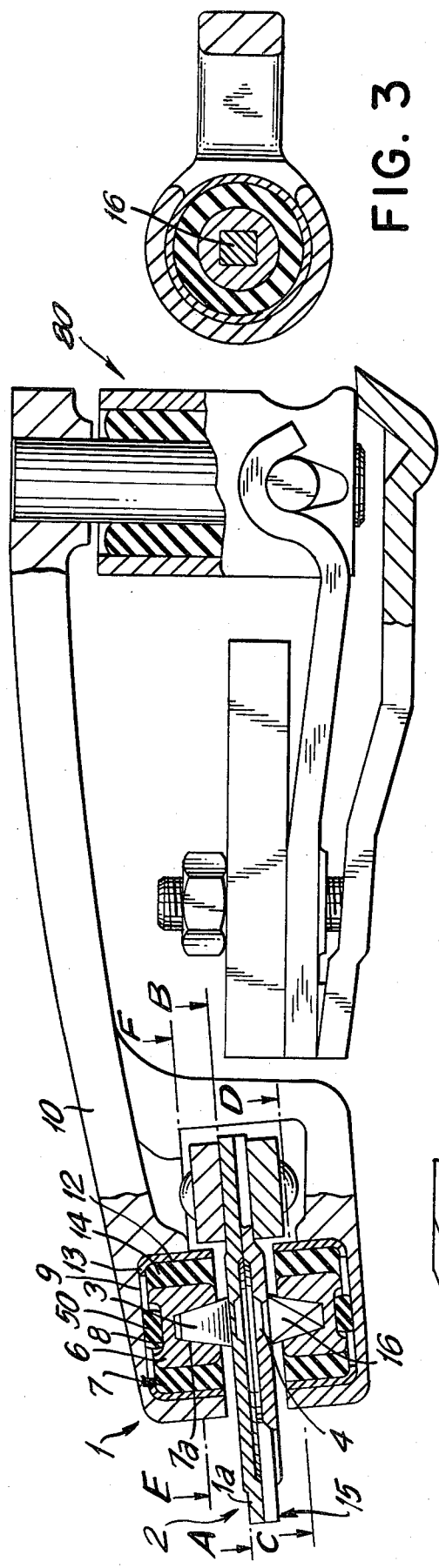
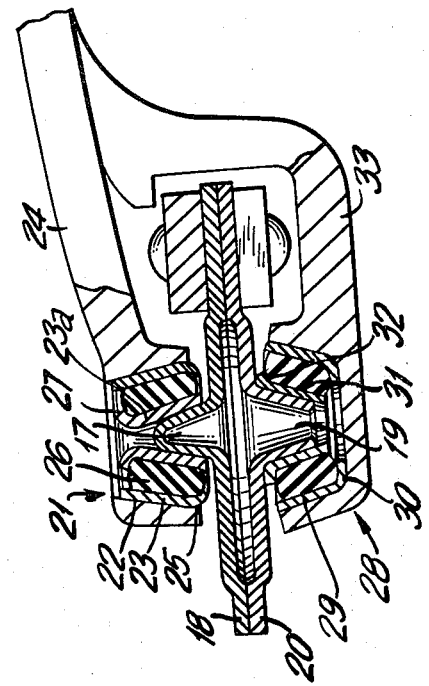
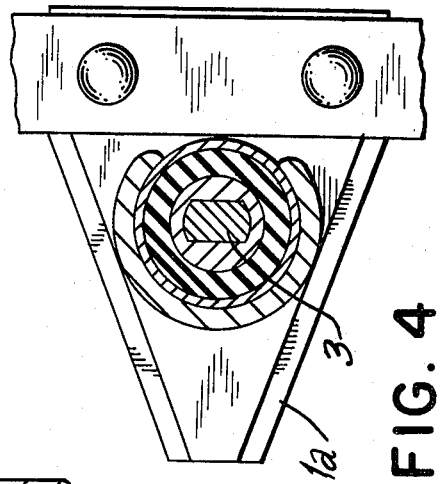
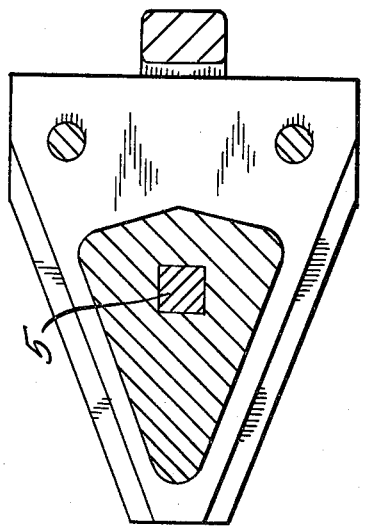
FIG. 1  FIG. 2  FIG. 3  FIG. 4  FIG. 5

THRUST SWIVEL BEARING ON MOWING KNIVES SUPPORTED IN SWINGING LEVERS OF MOWER CUTTING SYSTEMS

BACKGROUND OF THE INVENTION

The invention relates to the thrust swivel bearings on mowing knives supported in swing arms of mower cutting systems with reciprocating mowing knives of various types by means of which bearings the knives are always resiliently pressed on in the cutting region for the cutting contact.

Mower cutting systems of this kind with one or two reciprocating mowing knives serve the purpose of cutting stalky crops, such as, grass, clover, corn or the like, without clogging while requiring little maintenance.

For reaching this goal, it is known from West German Patent No. 1,290,757 to construct double-knife mower cutting systems in such a manner that the two oppositely moving mowing knives are supported on swing arms so that the knives are always resiliently pressed against each other in the cutting region. However, this construction has several deficiencies, especially since the swing arms rest directly on the mowing knives without a special thrust bearing and, for driving, surround engaging pieces 13 of the mowing knives. This metallic contact of the swing arms causes significant wear in all components, i.e., the swing arms, the knife blades, and the engaging pieces, as a result of the sliding frictional conditions which cannot be protected, especially under the influence of the sand and other dirt conditions during the mowing operation; as a result, these components become useless and must be replaced within a short time. This proposal has the further disadvantage that the swing arms cannot be adjusted with respect to their vertical positions and the pressure application on the mowing knives, and that, for replacing the knives, the swing arms must be raised in a cumbersome manner and removed in the raised position. For these reasons, these mower cutting systems were not widely accepted.

An improved mower cutting system of this type has been suggested in West German Patent No. 1,196,412, wherein the swing arms of a knife are arranged on resiliently acting swivel bearings which are adjustable with respect to the load application and by means of which the arms can be folded up for the exchange of knives. The swing arms of the other knife are supported through elastically acting swing arms which are vertically adjustable.

The known proposals for resiliently pressing swing arm supports for single-knife mower cutting systems, such as, for example, in accordance with West German Patent Nos. 803,685 and 1,119,581 and West German Utility Model No. 1,802,470, all have thrust swivel friction bearings which are also open at the bearing point between swinging lever and mowing knife and are usually subjected to a great wear at this point because the knife strokes are generally greater in single-knife mower cutting systems than in double-knife mower cutting systems.

In addition, in the known cutting systems, the knives are clasped by the swing arms so that the knives are swivable. However, every great and sudden load on the mowing knives during operation, for example, when the knives strike against solid resistance, is transmitted without damping to the swing arms, so that also these components are frequently damaged by bending or breaking. Furthermore, play in the bearing point between swing arm and mowing knife caused by the wear and reciprocating movements of the mowing knives with high frequency lead to a sudden pull on the guide arms whereby the driving forces are increased in a peak-like manner and the rivet joints between mowing knife blades and the mushroom-shaped projections which are engaged by the swing arms and between blades and mowing knife backs are also negatively affected, i.e., they soon become loose and then are completely destroyed which results in failure of the cutting systems and this, in turn, leads to long delays and expensive repairs. Furthermore, the secure support of the mowing knives suffers from the play in the bearings and from the loosening of the components; the arms frequently jump out of the mushroom-shaped projections and fall between the cutting edges of the blades, so that the blades and swing arms are damaged or, in most cases, destroyed.

In addition, the bearing play and the loose rivet joints of the components cause an annoying increase of the operating noise.

It is the primary object of the invention to provide, in mower cutting systems of the above-mentioned types, a construction of the thrust bearing between the swing arms and the mowing knife blades which eliminates any wear caused by sliding friction or dirty roller bearings or the like, is inexpensive and simple to maintain and insures an elastic and low-noise connection of the mowing knives and swing arms which is free of play.

In accordance with the invention, this object is met thereby that the thrust swivel bearing between the swing arm and the mowing knife is a rubber-metal block including internal and external bushings which are rigidly connected for rotation with the swing arm and the mowing knife, respectively, and an annular rubber portion disposed between the internal and external bushings, wherein one of these connections can be quickly disconnected in axial direction of the bushings.

In accordance with another proposal according to the invention, it is especially advantageous to provide the mowing knives with coupling pins which are conical and, for the torsional drive, are flattened, or are truncated pyramid-shaped or are polygonal in the cross section, the rubber-metal blocks which are rigidly mounted in the swing arms engaging over these coupling pins with their internal bushings in a form-closing manner.

In accordance with the invention, these coupling pins are constructed with respect to their side angles relative to each other in such a manner that the pairs of coupling parts are just short of the limit of self-locking whereby a secure and firm seat is achieved.

In accordance with the invention, the holes in the knife blades for riveting the coupling pins to the blades are also constructed noncircular or profiled, such as, for example, as an elliptic hole, an oblong hole, a polygonal hole or the like, so that, after riveting these pins to the blades, this connection remains fixed with respect to rotation also with respect to continuous load, even when the riveting should have loosened slightly.

In accordance with a special embodiment of the invention, a truncated pyramid-shaped coupling pin can also be produced by chipless shaping of the blade itself; this represents a simple and economical shape.

In accordance with another embodiment of the invention, the coupling pin is arranged on a support member which is connected to the rivets which connect the knife blades to the knife back, or is connected to the knife back through another, separate riveting. The support member and the coupling pin can be made of one piece, or they can be two separate pieces which are connected to each other by means of riveting or welding or the like. This is particularly advantageous because the mowing knife blades are parts which are subject to wear and must be replaced frequently and, in this manner, the coupling pin is always retained for the entire service life of the mowing knives and can even be removed from mowing knives which are to be scrapped and can be used again.

The rubber-metal block can also be constructed differently; for example, it can be forceably inserted or vulcanized with its rubber portion directly in the recess of the guide arm receiving the rubber-metal block, and the rubber portion can be connected to the internal bushing by vulcanizing. The rubber-metal block can also have an external bushing in the form of a tube or the like which, in accordance with a special proposal, is flanged at the side facing away from the knife blades for an axial contact with the end face of the rubber portion. Further, between the closed outer end face of the internal bushing and the bottom of the recess of the swing arm, a rubber plug may be concentrically inserted or vulcanized onto the internal bushing. In the latter embodiment, the rubber portion essentially transmits the radial forces and the rotation, while the rubber plug transmits the axial forces.

It is also possible to construct the external bushing and the internal bushing conical at their sides facing the rubber portion of the rubber-metal block, so that the radial and axial forces and the rotation can be safely transmitted by the rubber portion from the internal to the external bushing, wherein additional flanges can be provided on the external and internal bushings against which the rubber portion bears in the direction of load application. In these rubber-metal blocks, the rubber portions can be pressed between the internal and external bushings or they can be vulcanized onto the internal bushing or both bushings. For a secure support particularly in the case of rubber portions which are pressed in and for the time period without radial load, appropriate flanges can be provided at the edges of individual or all bushings.

In accordance with the invention, in cutting systems in which the swivel angle of the swing arms becomes great either because of great strokes of the knives or when relatively short swing arms must be used for reasons of space, the rubber portions are provided with appropriately thick walls, or rubber-metal double blocks are proposed in which the two rubber-metal blocks are arranged radially opposite each other, and it is possible to provide for transmitting the axial forces a rubber buffer, or rubber buffers for each block, in the center of the blocks.

In embodiments in which the rubber-metal block is fixedly arranged on the mowing knife, it is suggested in accordance with the invention to provide the swing arm with a cup-like coupling piece whose inner coupling hole is constructed conical, and wherein this cone, for transmitting the rotation forces, is profiled, for example, polygonal or with conically-shaped bulges, wherein the outer circumferential surface of the external bushing of the rubber-metal block is constructed as a counter-coupling piece in such a way that a form-closing connection is achieved.

When the rubber-metal block is fixedly arranged on the mowing knife, it is also possible to provide the end of the swing arm with a conical or wedge-like profiled pin which engages in a form-closing manner in an appropriately designed hole of the internal bushing of the rubber-metal block.

In swinging lever supports in which the rear swivel axis is approximately perpendicular and which are used in cutting systems in which the knives extend forwardly and downwardly under the conventional angle of about 4 to 8 degrees, it is proposed in accordance with the invention that the coupling pin or the rubber-metal block of the mowing knife also extends approximately perpendicular, i.e., approximately parallel with the rear support of the swinging lever on the back of the bar of the cutting system.

The invention is not limited to the recited examples with the respectively illustrated structural details; on the contrary, all the individually described and illustrated features can be utilized interchangeably without departing from the invention.

The advantages achieved with the invention reside particularly in the fact that, in the case of reciprocating mowing knives which are supported by means of swing arms, a non-wearing support is created for the thrust swivel bearing between the swing arm and the mowing knife, which support is simple in its construction, free of maintenance and additionally represents an axially and radially elastic connection between mowing knives and swing arms. This connection reduces the impact effects of the reciprocating system on all components and further acts as a restoring spring aiding in the drive of the mower knives because the rubber-metal block is tensioned for rotation during the second half of the stroke of the swivel motion and this tension supports the return stroke. Additionally a quick uncoupling of the bearing connection between swing arm and mowing knife which is free of play is possible, so that the exchange of knives can be performed easily and quickly and a low-noise support is created.

BRIEF DESCRIPTION OF THE DRAWING

In the drawing:

FIG. 1 shows shows a cross section through a double-knife mower cutting system with upper and lower swing arms arranged on the back of the bar.

FIG. 2 shows a section taken along the line A–B of FIG. 1.

FIG. 3 shows a section taken along the line C–D of FIG. 1.

FIG. 4 shows a section taken along the line E–F of FIG. 1.

FIG. 5 shows a section taken through the mowing knife anf thrust swivel bearing portion of a double-knife cutting system in which the truncated pyramid-shaped coupling pins for the knives are produced by deforming the blades and wherein rubber-metal blocks with conical outer and inner jackets are provided.

DETAILED DESCRIPTION OF THE INVENTION

Figure 6:
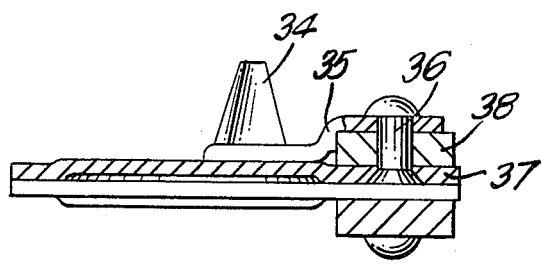
FIG. 6 shows a cross section taken along the sectional line G–H of FIG. 7 through the knives of a double-knife cutting system in which the truncated pyramid-shaped coupling pin is arranged on a support member which is connected with knife backs by means of the rivets of the mowing knife blades.

In accordance with FIG. 1, a thrust swivel bearing 1 is arranged above an upper mowing knife 2 thereby that a rubber-metal block 7 which is inserted in a recess of an upper swing arm 10 engages with its internal bushing 6 over a truncated pyramid-shaped coupling pin 3. This pin 3 is connected to the knife blade 1a through its snaphead 4. A hole 5 in the mowing knife blade 1a is rectangular in its cylindrical portion and the rivet shaft for the snaphead 4 of the coupling pin 3 either adjusts during riveting to this rectangular hole or is constructed rectangular before riveting. Instead of the rectangular hole, it is also possible to provide an oblong hole or a hole of any other shape.

As illustrated in FIGS. 1 and 4, the truncated pyramid-shaped, conical coupling pin 3 has a flat surface at the front and the rear and the internal bushing 6 of the rubber-metal block 7 is with its coupling hole 7a produced on all sides internally with such a shape that it engages in a form-closing manner the engaging pin 3.

On the outer end face 8 of the internal bushing 6 there is provided a rubber plug 50 which may be connected to the internal bushing 6 or the bottom surface 9 of the recess in the upper swing arm 10 by means of vulcanizing or this rubber plug, as illustrated, rests against the bottom surface 9 of the upper swing arm 10. For axially securing the rubber bushing 14, the external bushing 12 of the rubber-metal block 7 has at its outer end face a flange 13 which bears against the rubber bushing 14.

As illustrated in FIGS. 1 and 3, the coupling pin 16 of the lower cutting knife 15 is constructed as a truncated, four-sided pyramid.

The coupling pin 17 according to FIG. 5 is produced by deep-drawing from the material of the knife blade 18; its cross-sectional profile may vary, for example, it may be elliptical, polygonal or the like.

According to FIG. 5 the coupling pin 19 of the knife blade 20 is also formed from the material of the blade, however, it is open at its upper side, so that a larger design of the coupling pin becomes possible.

The rubber-metal block 21 shown in the upper swing arm 24, FIG. 5, has conically constructed internal and external bushings; the external bushing 23 which is inserted into the corresponding recess 22 of the upper swing arm 24, is provided on the side facing the mowing knife with a flange 25 with which the rubber portion 26 makes contact. On the other side, the rubber portion bears against the flange 27 of the internal bushing 23a; as a result, it is insured that the entire rubber-metal block is held together in the state of no load. In the rubber-metal block 28, in the lower swing arm 33, the external bushing 29 has the flange 30 on the side facing away from mowing knife and the internal bushing 31 has the flange 32 on the side facing the mowing knife. These flanges insure that the axial forces from the upper swing lever 24 and the lower swing lever 33 are safely transmitted to these rubber-metal blocks. It is possible to provide the bushings of the rubber-metal block 28 additionally with the flanges described in connection with the rubber-metal block 21; this is especially necessary if the rubber portions are not connected to the bushings by means of vulcanizing.

The coupling pins 17 and 19 of the mowing knife blades are profiled in their cross sections, for example, they are polygonal, or the like, and the corresponding internal bushings of the rubber-metal blocks surround these coupling pins in a form-closing manner.

Figure 7:
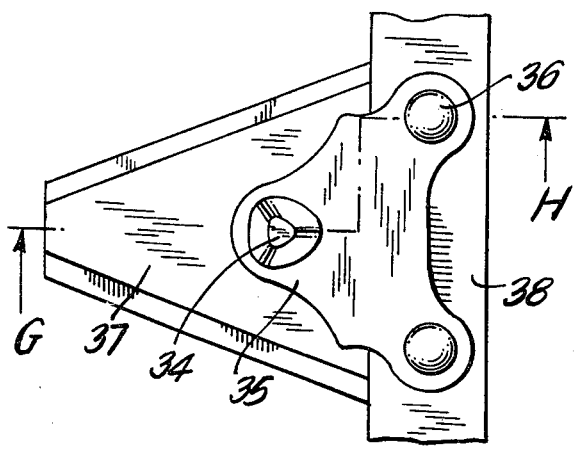
FIG. 7 is a top view in accordance with FIG. 6.

In the embodiment according to FIGS. 6 and 7, the coupling pin 34 is arranged on a support member 35 with which it can be made in one piece, or coupling pin 34 and support member 35 may be produced separately and then connected by means of riveting or welding, soldering or the like. The support member 35 is also connected to the rivets 36 by means of which the mowing knife blades 37 are connected to the knife back 38. FIG. 7 shows the three-sided, polygonal design of the coupling pin 34 used as an example.

Figure 8:
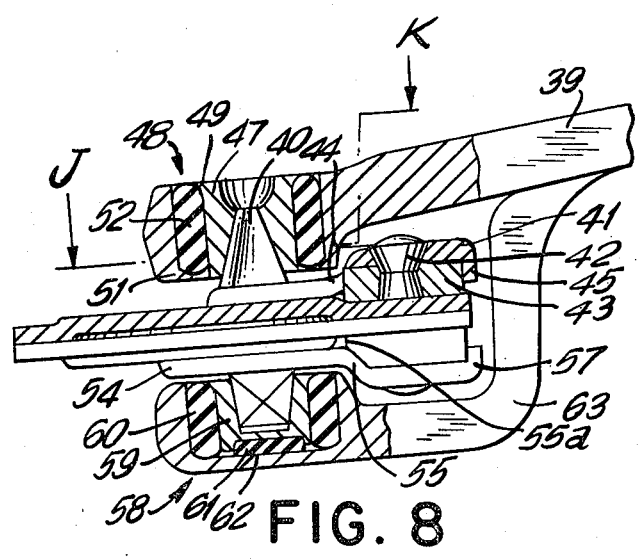
FIG.8 is a cross section taken through the knife portion of a double-knife cutting system in which the truncated pyramid-shaped coupling pin is arranged on a support member which is connected to the mowing knife back independently from the rivets of the mowing knives by means of another riveting.

The coupling pin 40 according to FIG. 8 is also arranged on a support member 41 which is connected to the mowing knife back 43 through the rivet 42. For safely transmitting the forces from the knife back to the support member, the support member 41 surrounds with its forward side portion 44 and with its rearward side portion 45 the knife back 43, so that the support member 41 is arranged independently from the riveting of the mowing knife blades. On the side facing away from the mowing knife, the internal bushing 47 of the rubber-metal block 48 has a flange 49 and the swing arm 50 has on the side facing the mowing knife a flange 51 for the rubber portion 52. These two flanges safely transmit the forces of the swing arm to the mowing knives over the end faces of the rubber portions.

The support member 54 bears with its forward side portion 55 against the correspondingly constructed level 55a of the knife back 56 and with its rearward side portion 57 against the rear edge of the knife back 56.

Figure 9:
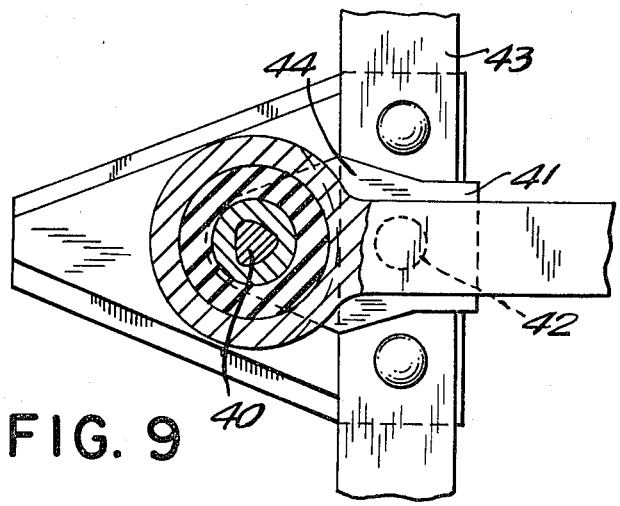
FIG. 9 is a sectional representation in accordance with line J–K of FIG. 8.

The rubber-metal block 58 is composed of the internal bushing 59, the rubber portion 60 and the plug 61 which is arranged between the internal bushing 59 and the bottom surface 62 of the swing arm 63. As illustrated in FIG. 9, the coupling pin 40 is polygonal with three sides.

Figure 10:
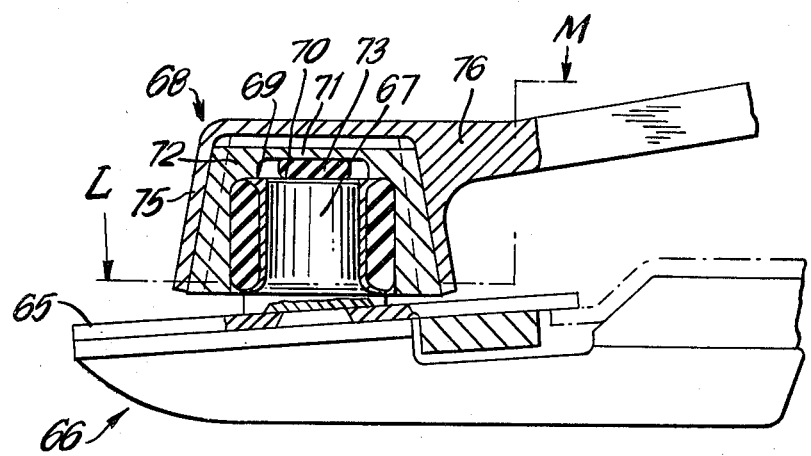
FIG. 10 is a partial cross section taken through a single-knife mulching cutting system.
Figure 11:
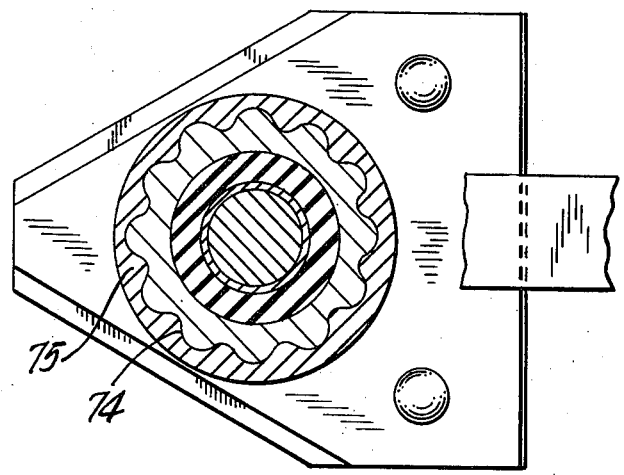
FIG. 11 is a sectional representation in accordance with line L–M of FIG. 10.

The mowing knife blade 65 of the single-knife mulching cutting system 66 according to FIG. 10 is fixedly connected to the bolt 67 by means of riveting and the rubber-metal block 68 is pressed onto the bolt 67 with its internal bushing 69. The rubber plug 73 is arranged between the end face 70 of the bolt 67 at the bottom surface 71 of external bushing 72. The external bushing 72 has a conical outer surface and is provided with wave-like ribs 74, and the coupling cap 75 of the swing arm 76 surrounds in a form-closing manner the external bushing 72 of the rubber-metal block 68.

Figure 12:
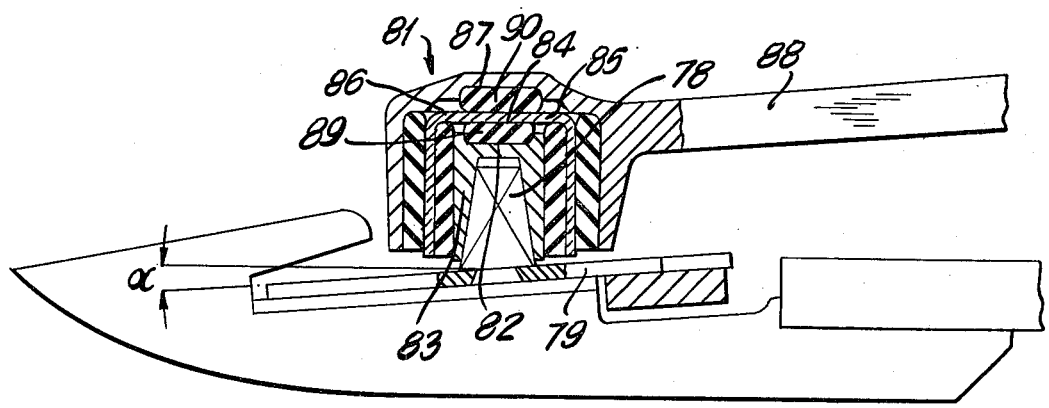
FIG. 12 is a partial cross section taken through a single-knife finger mower cutting system.

In the embodiment according to FIG. 12, the coupling pin 78 is joined to the knife blade 79 of the single-knife finger cutting system by means of riveting. The coupling pin 78 is arranged in an approximately vertical position, while the mowing knife 79 is arranged inclined forwardly and downwardly by the angle α. As a result, the pin is approximately parallel to the usually approximately vertically extending swivel bearings 80 of the swing levers according to FIG. 1, so that the swivel motion resulting from the stroke of the knife does not result in tilting of the components of the rubber-metal block relative to one another.

The double metal block 81 according to FIG. 12 allows relatively great swivel angles; its use is advantageous when greater swivel angles result from the ratio of the stroke of the mowing knife relative to the length of the swing lever. The rubber buffer 89 is provided between the end face 82 of the inner portion 83 of the inner metal-rubber block and the bottom surface 84 of the internal bushing 85 of the outer rubber-metal block, and the rubber buffer 90 is arranged between the upper end face 86 of the internal bushing 85 at the bottom surface 87 of the recess of the swing arm 88. Both buffers serve to absorb the axial forces.

Figure 13:
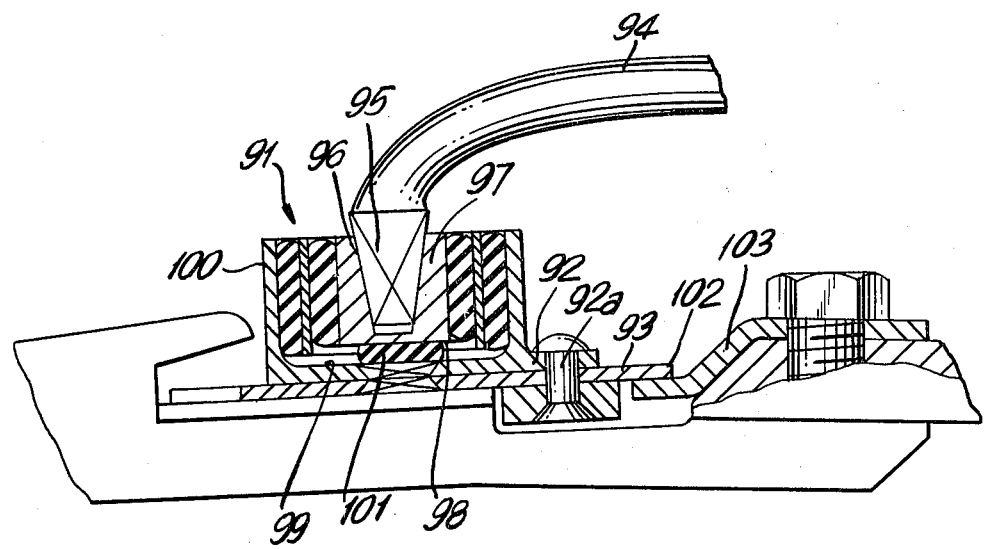
FIG. 13 is a partial cross section in accordance with sectional line O–P of FIG. 14 through a single-knife finger mowing cutting system in which the swing arm engages with its wedge-shaped coupling piece in the appropriately shaped internal bushing of the rubber-metal block on the mowing knife.
Figure 14:
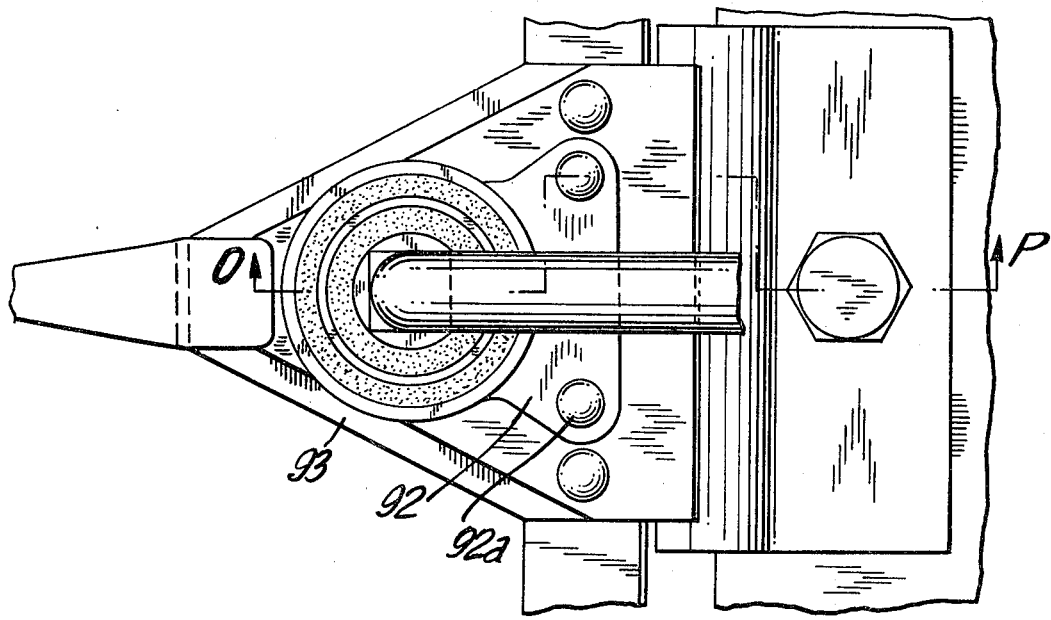
FIG. 14 is a top view in accordance with FIG. 13.

In the embodiment according to FIGS. 13 and 14, a double metal block 91 is arranged, for example, through a lug 92 with the rivets 92a which also fasten the mowing knife blade 93. With its truncated, 4-sided, pyramid-shaped top 95, the swing arm 94 engages in a form-closing manner in the oppositely arranged hole 96 of the internal bushing 97.

A rubber buffer 101 is provided between the face 98 of the internal bushing 97 and the bottom surface 99 of the outer housing 100 of the rubber-metal block. The riveted portion 102 of the mowing knife blade 93 rests, in a manner known per se, on a knife guide plate 103.

We claim:

1. A thrust swivel bearing for resiliently supporting a mowing knife in a swing arm of a mower cutting system, comprising a rubber-metal block including an external metal bushing adapted for non-rotatable connection with the swing arm, an annular rubber portion disposed concentrically within said external bushing, and an internal metal bushing disposed concentrically within said rubber portion, and engagement means for non-rotatably securing said rubber-metal block to the mowing knife, said engagement means including a coupling pin surrounded by said internal bushing, said coupling pin adapted for connection to the mowing knife, said rubber-metal block capable of being disconnected in axial direction of said bushings from either one of the swing arm and the mowing knife.

2. Thrust swivel bearing according to claim 1, wherein said coupling pin is a truncated cone-shaped member having a non-circular cross-section in its transverse direction.

3. Thrust swivel bearing according to claim 2, wherein the side angles of said coupling pin are dimensioned in such a way that said engagement with said bushing slightly exceeds the self-locking action.

4. Thrust swivel bearing according to claim 2, wherein, for connecting said coupling pin to the mowing knife, the mowing knife has a non-circular hole.

5. Thrust swivel bearing according to claim 1, wherein said coupling pin is produced by chipless deformation of the mowing knife.

6. Thrust swivel bearing according to claim 1, wherein said engagement means includes a support member engaging said coupling pin and the mowing knife back, said support member riveted to the blades of the mowing knife.

7. Thrust swivel bearing according to claim 1, wherein said engagement means includes a support member engaging said coupling pin and the mowing knife blade, said support member riveted to the knife back.

8. Thrust swivel bearing according to claim 1, wherein said support member has forward and rearward side portions bearing against the edges of the knife back, said forward side portion being inclined to conform to a bevel of the knife back.

9. Thrust swivel bearing according to claim 1, wherein said rubber portion of said rubber-metal block is connected to said external bushing and said internal bushing by means of vulcanizing.

10. Thrust swivel bearing according to claim 1, wherein said rubber portion is vulcanized onto said internal bushing and is pressed into said external bushing, and wherein said bushing is pressed into said recess of said swing arm.

11. Thrust swivel bearing according to claim 1, wherein, on the side facing away from the knife blade, said external bushing has a flange which bears against said rubber portion.

12. Thrust swivel bearing according to claim 1, comprising a rubber plug provided between the end face of said internal bushing facing said swing arm and the bottom surface of said recess of said swing arm, said rubber plug being inserted or vulcanized onto one of the contact surfaces.

13. Thrust swivel bearing according to claim 1, wherein said external bushing and said internal bushing of said rubber-metal block are constructed conically so that the greater diameter of said bushings is adjacent the knife, and wherein one edge each of said external bushing and said internal bushing has flanges for supporting said rubber portion in the axial direction.

14. Thrust swivel bearing according to claim 1, both edges of said internal bushing and external bushing have flanges for supporting said rubber portion in axial direction.

15. Thrust swivel bearing according to claim 1, comprising a further annular rubber portion concentrically surrounding said external bushing.

16. Thrust swivel bearing according to claim 1, comprising two rubber buffers one of which is provided between said internal bushing and the end face and the other is provided of said external bushing and said swing arm.

17. Thrust swivel bearing according to claim 1, wherein the swing arm is provided with a cup-like coupling cap whose inner wall is conical, said inner wall provided with wave-like ribs.

18. Thrust swivel bearing according to claim 1, wherein the mowing knife is arranged at an angle relative to the horizontal and said coupling pin extends approximately parallel to the swivel axis of the swing arm.

19. Thrust swivel bearing according to claim 1, wherein the swing arm is provided with a conical, pyramid-shaped top which engages said internal bushing.

* * * * *